April 1, 1952 S. F. REDO 2,590,890
WIRE REEL
Filed Sept. 3, 1947 2 SHEETS—SHEET 1

INVENTOR.
SAVERIO FRANK REDO
BY Edward T. Connors
ATTORNEY

April 1, 1952 S. F. REDO 2,590,890
WIRE REEL

Filed Sept. 3, 1947 2 SHEETS—SHEET 2

INVENTOR.
SAVERIO FRANK REDO
BY Edward T. Connors
ATTORNEY.

Patented Apr. 1, 1952

2,590,890

UNITED STATES PATENT OFFICE 2,590,890

WIRE REEL

Saverio Frank Redo, Springfield Gardens, N. Y.

Application September 3, 1947, Serial No. 771,951

1 Claim. (Cl. 191—12.4)

The present invention relates to wire winding devices and more particularly to an automatic rewinding device for electric cords or the like.

A device in accordance with the invention is of use in connection with electrical devices in which a length of cord is provided between the device and the outlet. The device is adapted to prevent tangling or wear of the cord and is particularly useful for the reeling of the cords of telephones, lamps, stage-lighting fixtures, fans, cooking appliances and other similar devices using electric cords.

An object of the invention is to provide a wire reel for the cords of electrical appliances and the like which is adapted to automatically rewind the cord upon the actuation of a release means.

Another object is to provide a wire reel which is light in weight and compact in construction.

Another object is to provide a wire reel which is simple in design and which may be manufactured without the requirement of a high degree of mechanical skill.

Another object is to provide a wire reel which is rugged in construction and which can withstand any rough usage to which it may be subjected.

In accordance with the invention, the foregoing objects are accomplished by providing a wire reel comprising a support for a reel which is rotatably mounted thereon and resiliently urged in one direction to rewind wire withdrawn therefrom, the rewinding energy being stored in the resilient means by the unwinding of the cord. Sliding electric contact means are provided between the rotatable reel and its support so that the cord is not stressed by the rotation of the reel. Plug connection means are provided in the support for attachment of the reeled cord to an electric circuit.

Other objects of the invention will be apparent from the following description and from the accompanying drawings which show, by way of example, an embodiment of the invention.

Figure 1:
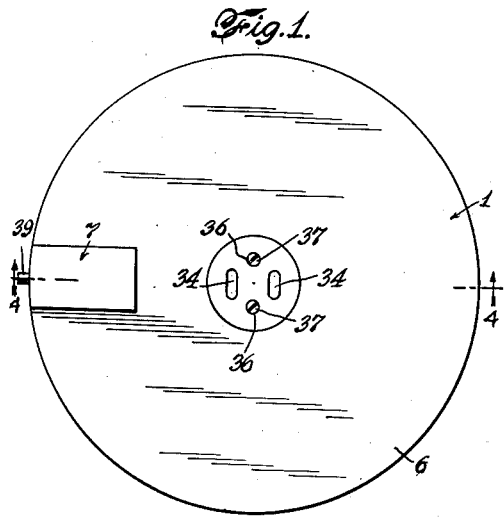
Fig. 1 is a plan view of a wire reel in accordance with the invention.
Figure 3:
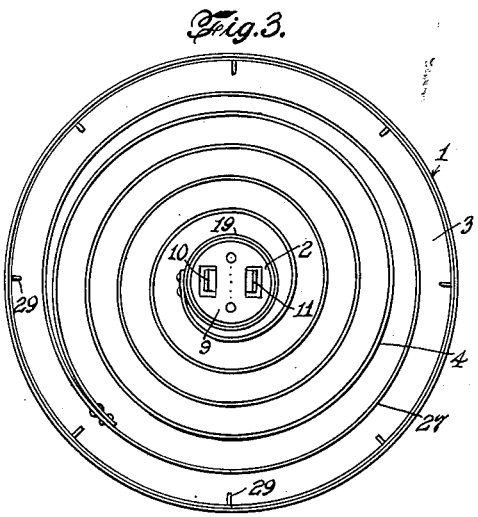
Fig. 3 is a sectional view of the wire reel taken along the line 3—3 of Fig. 2.
Figure 2:
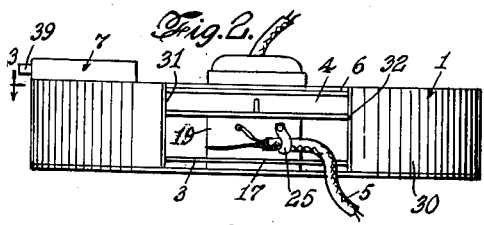
Fig. 2 is a side view of the wire reel showing an end of a cord attached to the reel.
Figure 4:
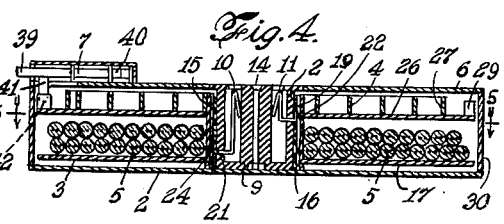
Fig. 4 is a sectional view of the wire reel taken along the line 4—4 of Fig. 1.
Figure 5:
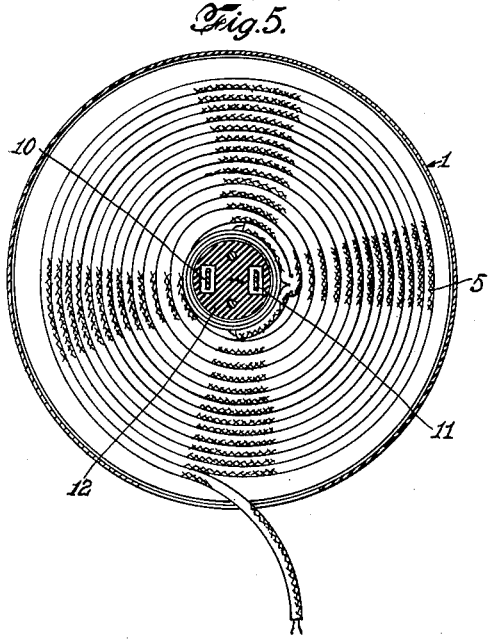
Fig. 5 is a sectional view of the wire reel taken along the line 5—5 of Fig. 4.

Referring to the drawings there is shown in Fig. 1 a wire reel 1 in accordance with the invention. The wire reel comprises a supporting member 2 on which is rotatably mounted a reel 3. A spring 4 is adapted to be wound by the unwinding of a cord 5 attached to the reel 3. A cover plate 6 encloses the mechanism of the reel and carries a latching release means 7 adapted to be actuated to allow the spring 4 to turn the reel 3 so as to wind up the cord 5.

The supporting member 2 may be made of any suitable material such as metal or plastic, and is preferably circular in shape. The supporting member is adapted to be attached to any appropriate fixed surface such as the base of a telephone, lamp or other appliance, or it may be attached to a wall or table. A hollow cylindrical member 9 made of insulating material is formed integral with, or attached to, the center of the supporting member 2 to provide bearing means for the reel 3. Electric plug connection means is positioned within the cylindrical member and includes spring contact members 10 and 11 adapted to receive the usual male electric connection plug. The contact members are preferably molded in the hollow cylindrical member 9 and frictionally or adhesively retained in position. The cylindrical member 9 is drilled and fitted with a bolt in the center as indicated at 14 to provide attachment means for the cover plate 6. The outer surface of the cylindrical member is adapted to support and insulate a pair of annular electric slip rings 15 and 16 which are retained in position in spaced relationship by the insulating material. Electrical contact is made between each of the rings 15 and 16 and one of the contact members 10 and 11 by extensions of the contact members extending through perforations in the wall of the cylindrical member 9.

The reel 3 is preferably made with one side wall 17 and its hub or center portion 19 integral. The center portion 19 is made of a size to be rotatably mounted on the cylindrical member 9. Spring contact members 20 and 21 are positioned on the inner surface of the center portion 19 so that each makes electrical contact with one of the slip rings 15 and 16, ends of the contact members being brought to nut and bolt members 22 and 24 extending through perforations in the center portion 19 and providing means for attaching the wires of cord 5 to the contact members. A clip 25 may be used to attach the cord 5 to the center portion 19 to relieve the strain between the connections of the wires of the cord and the nut and bolt members as the reel is unwound.

The outer wall 26 of the reel 3 is attached to the center portion 19 in any usual manner such as by cementing, welding or by equivalent constructions. An annular rim 27 is positioned on the outer side of the wall 26 to form a spring coil retainer and carries the coiled spiral spring 4, one end of the spring 4 being attached to the rim 27 while the other end of the spring is attached to the cylindrical member 9 by a rivet 28. In order that the reel may be retained in position with the cord unwound, the periphery of the outer side of the wall 26 is formed with prongs or lugs 29 adapted to engage with the latching release means 7. The prongs 29 are preferably angularly spaced about 30 degrees apart.

The cover plate 6 is formed with a side wall 30 adapted to practically completely enclose the mechanism of the wire reel. An opening 31 in the side wall 30 for the passage of the cord 5 is formed with a rolled edge 32 to prevent chafing of the cord. The cover plate 6 is made with apertures 34 positioned to correspond to the connection plug members 10 and 11. Other apertures 36 are adapted to receive flat-headed screws 37 to engage with the drilled and tapped holes 14 to hold the cover plate 6 in position over the reel 3.

The latching release means 7 is carried by the cover plate 6 and includes a rod 39 normally urged outwardly by a spring 40. An extension 41 is formed with a surface 42 adapted to engage with the prongs or lugs 29. By moving the rod 39 inwardly, the surface 42 of the extension 41 is moved away from the prongs 29 and the reel 3 is freed to rotate.

Cord is placed on the wire reel by removing the cover plate 3 and rotating the reel 3 to wind the spring 4 to the desired tension. The wires of the electric cord 5 are then attached to the nut and bolt members 22 and 24. The clip 25 is attached to securely hold the cord 5 to the center portion 19 of the reel. The reel is then allowed to rotate winding the cord thereon. The cover plate 6 is positioned over the mechanism and secured by screws 37. In withdrawing the cord from the reel, the rod 39 is depressed and the desired length of cord unreeled. The rod 39 is then released holding the reel from rotating and rewinding the cord. In the event it is desired to rewind the cord, the rod 39 is depressed and the reel 3 rotates winding the cord thereon.

Figure 6:
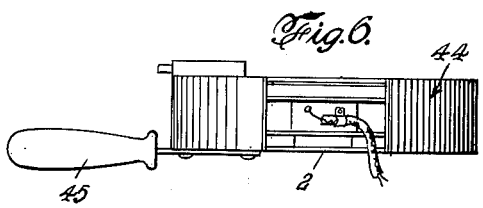
Fig. 6 is a side view on a reduced scale of a modified form of wire reel in accordance with the invention.
Figure 7:
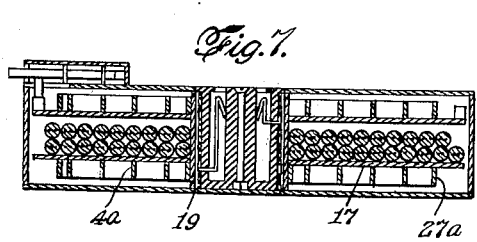
Fig. 7 is a sectional view of the wire reel shown in Fig. 6 and corresponding to the view of the wire reel shown in Fig. 4.
Figure 8:
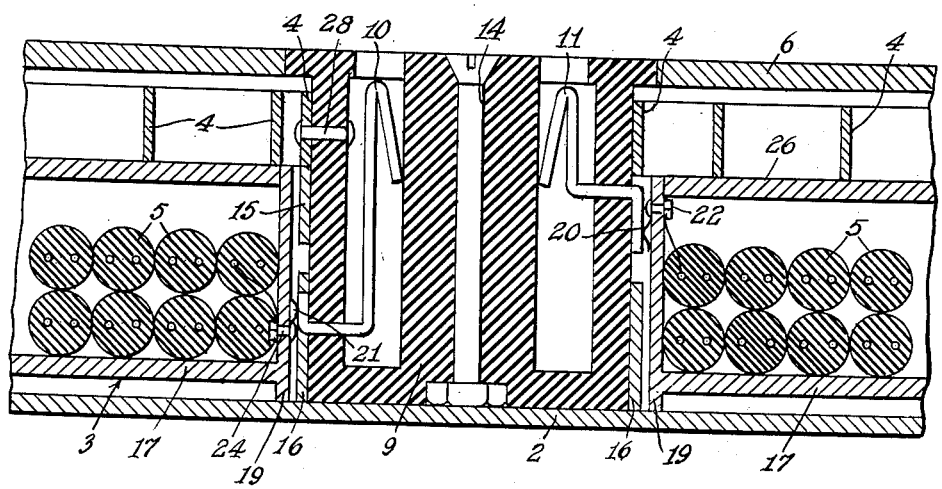
Fig. 8 is an enlarged fragmentary view of a portion of Fig. 4.

Another embodiment of the invention is shown in Figs. 6 and 7 in which a portable wire reel 44 is disclosed. The supporting member 2 is supplied with a handle 45 to hold the device while cord is being wound thereon or removed therefrom and for carrying the device. This embodiment is particularly suitable for the cords of trouble lamps and other portable devices. In order to provide more tension for the rewinding of the cord, this form of the device is provided with a double spring. In this embodiment, the side wall 17 of the reel 3 is provided with an annular rim 27a to form a spring coil retainer for a second spring 4a. The spring 4a is attached at one end to the rim 27a and at its other end to the cylindrical member 9. The springs 4 and 4a are coiled in the same direction so that the tension supplied thereby is doubled.

From the foregoing description it will be seen that a wire reel has been provided in accordance with the invention which is adapted to automatically rewind a cord upon the actuation of the release means. The wire reel is light in weight, compact in construction, and adapted to withstand rough usage.

While the invention has been described and illustrated with reference to specific embodiments thereof, it will be understood that other embodiments may be resorted to without departing from the invention. The size of the reel and the strength of the spring may be varied depending upon the size and length of the cord to be wound thereon. Therefore, the form of the invention set out above should be considered as illustrative and not as limiting the scope of the following claim.

I claim:

A wire reel comprising a base member, a hollow cylindrical supporting member projecting upwardly from the base member, a pair of metal slip rings positioned on the outer surface of the hollow cylindrical member, the slip rings electrically insulated from each other, female electrical connection means adapted to receive an appliance connection and positioned within the hollow cylindrical member and electrically connected with the slip rings, a wire reel for an electric cord, the wire reel having a hollow hub adapted to receive the hollow cylindrical member, the wire reel including a pair of radially extending flanges to receive wire therebetween, electrical contact means carried by the wire reel and extending inwardly to make sliding contact with the slip rings, a spring positioned at the upper side of the wire reel, the spring having one end attached to the wire reel and having its other end attached to the cylindrical member, an annular member attached to the upper side of the wire reel adjacent the periphery thereof to restrict the outward expansion of the spiral spring and providing means attaching the spring to the wire reel, a plurality of stop members extending radially from the upper side of the wire reel, a cover plate secured to the cylindrical member, and a latch member carried by the cover member and adapted to engage with one of the stop members to releasably oppose the rotation of the wire reel in the direction to unwind the spring to wind an electrical cord on the wire reel.

S. FRANK REDO.

REFERENCES CITED

The following references are of record in the file of this patent:

UNITED STATES PATENTS

| Number | Name | Date |
| --- | --- | --- |
| 1,024,417 | Pagnod | Apr. 23, 1912 |
| 1,770,454 | Beck et al. | July 15, 1930 |
| 1,978,734 | Apple et al. | Oct. 30, 1934 |
| 2,232,580 | Wickemeyer | Feb. 18, 1941 |
| 2,391,840 | Meletti | Dec. 25, 1945 |
| 2,514,628 | Cortes | July 11, 1950 |

FOREIGN PATENTS

| Number | Country | Date |
| --- | --- | --- |
| 657,150 | France | Jan. 11, 1929 |
| 23,641 | Great Britain | Oct. 25, 1907 |